(12) United States Patent
Jacob Sushil et al.

(10) Patent No.: US 11,301,444 B2
(45) Date of Patent: Apr. 12, 2022

(54) METHODS AND SYSTEMS FOR DATA TRACEABILITY AND PROVENANCE

(71) Applicant: INTERNATIONAL BUSINESS MACHINES CORPORATION, Armonk, NY (US)

(72) Inventors: George Thayyil Jacob Sushil, Bangalore (IN); Kalapriya Kannan, Bangalore (IN); Sumanth Tummala, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/929,420

(22) Filed: Apr. 30, 2020

(65) Prior Publication Data
US 2021/0342321 A1 Nov. 4, 2021

(51) Int. Cl.
*G06F 16/21* (2019.01)
*G06F 16/25* (2019.01)
*G06F 16/182* (2019.01)
*G06F 16/17* (2019.01)
*G06F 11/34* (2006.01)
*G06F 9/54* (2006.01)
*G06F 11/32* (2006.01)

(52) U.S. Cl.
CPC ............ *G06F 16/219* (2019.01); *G06F 9/54* (2013.01); *G06F 11/323* (2013.01); *G06F 11/3466* (2013.01); *G06F 16/1734* (2019.01); *G06F 16/182* (2019.01); *G06F 16/25* (2019.01)

(58) Field of Classification Search
CPC ...... G06F 16/219; G06F 16/25; G06F 16/182; G06F 16/54; G06F 16/3466; G06F 16/323; G06F 16/1734
USPC ........................................................ 707/694
See application file for complete search history.

(56) References Cited

U.S. PATENT DOCUMENTS

| | | | |
|---|---|---|---|
| 6,434,558 B1 | 8/2002 | Macleod et al. | |
| 9,110,967 B2 | 8/2015 | Halberstadt | |
| 9,384,193 B2 | 7/2016 | Velasco | |
| 10,445,170 B1 | 10/2019 | Subramanian et al. | |
| 10,791,063 B1 * | 9/2020 | Florissi | H04L 47/783 |
| 2004/0168173 A1 * | 8/2004 | Cohen | G06F 21/55 719/310 |
| 2010/0082963 A1 * | 4/2010 | Li | G06F 11/1417 713/2 |
| 2013/0232540 A1 * | 9/2013 | Saidi | H04L 63/10 726/1 |
| 2013/0332423 A1 | 12/2013 | Puri et al. | |

(Continued)

OTHER PUBLICATIONS

Woodruff, A., & Stonebraker, M. (1997). Supporting finegrained data lineage in a database visualization environment. In Data Engineering, 1997. Proceedings. 13th International Conference on (pp. 91-102). IEEE.

(Continued)

*Primary Examiner* — Kuen S Lu
(74) *Attorney, Agent, or Firm* — Griffiths & Seaton PLLC

(57) ABSTRACT

Embodiments for determining processing performed on a data element are provided. A file system call associated with a data element stored in a storage system is detected. The file system call is analyzed. Data lineage for the data element is determined based on the analyzing of the file system call.

18 Claims, 11 Drawing Sheets

(56) References Cited

U.S. PATENT DOCUMENTS

| | | | |
|---|---|---|---|
| 2015/0012478 A1* | 1/2015 | Mohammad | G06F 16/254 |
| | | | 707/602 |
| 2016/0028580 A1* | 1/2016 | Radivojevic | H04L 41/0213 |
| | | | 709/223 |
| 2017/0270022 A1 | 9/2017 | Moresmau et al. | |
| 2018/0052878 A1 | 2/2018 | Seetharaman et al. | |
| 2018/0095773 A1* | 4/2018 | Akella | H04L 67/14 |
| 2019/0279281 A1* | 9/2019 | Kumar | G06Q 30/0631 |
| 2020/0026710 A1* | 1/2020 | Przada | G06F 16/254 |

OTHER PUBLICATIONS

Cheney, J., Chiticariu, L., & Tan, W. C. (2009). Provenance in databases: Why, how, and where. Now Publishers Inc. (98 Pages).
Lucian Carata et al. "A Primer on Provenance" Better understanding of data requires tracking its history and context. Apr. 10, 2014 (14 Pages).
6.033 2012 Design Project 1: "A provenance-tracking file system" http://web.mit.edu/6.033/2012/wwwdocs/assignments/dp1.html (7 Pages).
"RDD lineage in Spark: ToDebugString Method" Dataflair Team updated Sep. 17, 2018 https://data-flair.training/blogs/rdd-lineage/ (21 Pages).
"Practical Whole-System Provenance Capture" Thomas Pasquier et al. Nov. 14, 2017 (15 Pages).
"Discovering Data Lineage from Data Warehouse Procedures" Kalle Tomingas1, et al. Conference Paper • Jan. 2016 (11 Pages).

\* cited by examiner

METHODS AND SYSTEMS FOR DATA TRACEABILITY AND PROVENANCE

BACKGROUND OF THE INVENTION

Field of the Invention

The present invention relates in general to computing systems, and more particularly, to various embodiments for data traceability and provenance.

Description of the Related Art

In some modern computing environments, such as those related to artificial intelligence (AI), machine learning (ML), etc., data is gathered from multiple sources, stored in a centralized database (or unified platform), and made available for other applications. Such processing may include, for example, gathering, preparing, transforming, and cleansing the data, along with making it accessible on the centralized database. These systems may be considered to include (and/or utilize) multi-level data staging (or multi-level data staging systems). Each downstream application may then pull the data and perform multiple processing on it. In some instances, these processes include reusing the same data in various forms, going through multiple stages of transformation including, for example, column name changes.

If certain types of failures occur, or perhaps simply if the source of the data would like to be known, significant resources are typically required, as each step may have to be analyzed to determine what changes (or processing, transformations, etc.) have been made to (or performed on) the data and/or the originating source of the data. Although data lineage solutions are useful in such situations, at least to some extent, they are generally only applicable within the same ecosystem. Additionally, in order to identify and trace data changes, the appropriate logic has to be embedded in the application while the application is developed. For applications that have already been created, the code has to be retrofitted to include this functionality (e.g., the application has to be changed or rebuilt). This problem multiples and becomes particularly complicated in platforms that utilize data sources that involve heterogeneous systems, as current data lineage solutions can not address this issue in such instances.

SUMMARY OF THE INVENTION

Various embodiments for determining processing performed on a data element, by a processor, are provided. A file system call associated with a data element stored in a storage system is detected. The file system call is analyzed. Data lineage for the data element is determined based on the analyzing of the file system call.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
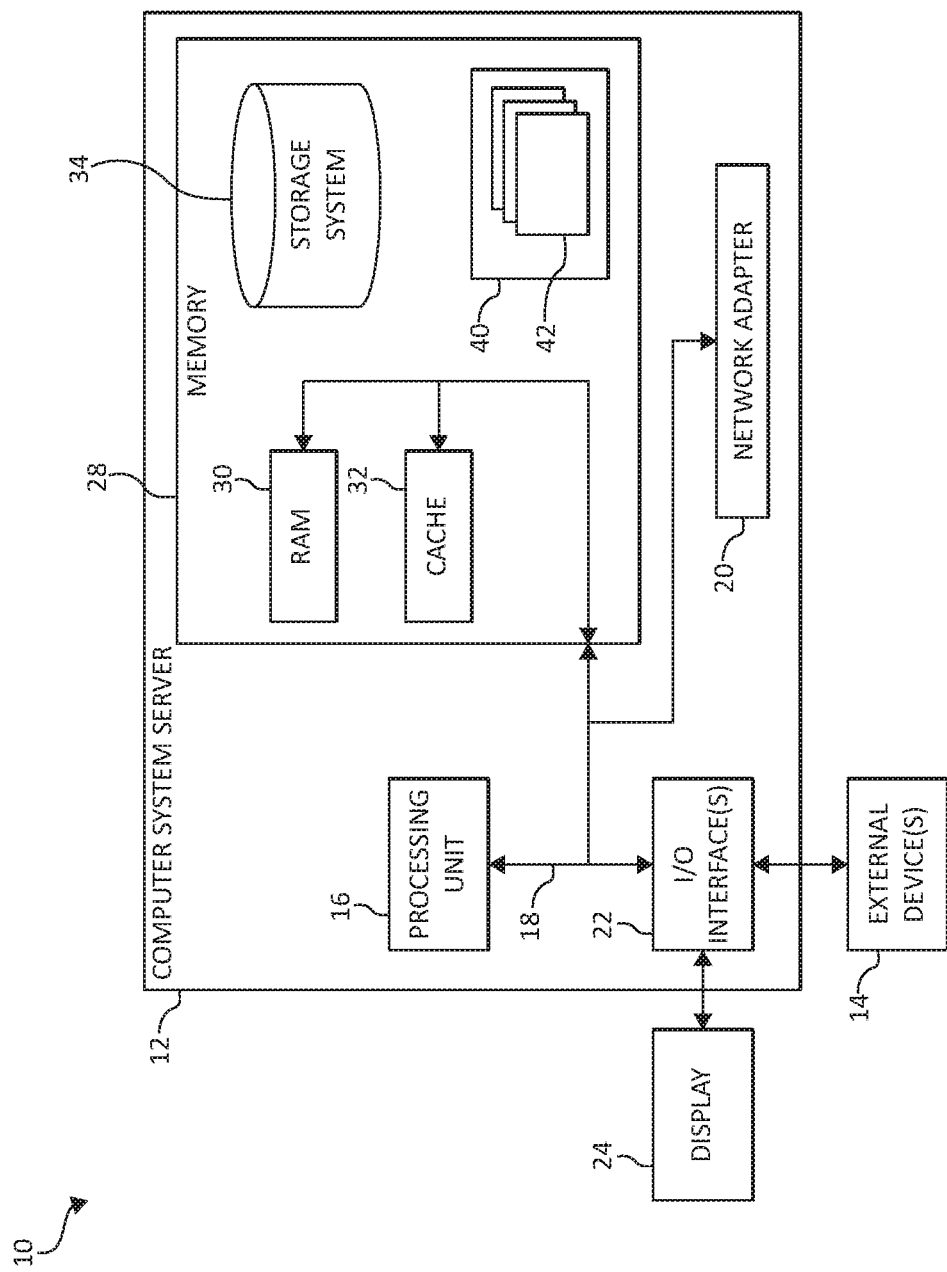
FIG. 1 is a block diagram depicting an exemplary computing node according to an embodiment of the present invention.

As discussed above, in some modern computing environments, such as those related to artificial intelligence (AI), machine learning (ML), etc., data is gathered from multiple sources, stored in a centralized database (or unified platform), and made available for other applications. Such processing may include, for example, gathering, preparing, transforming, and cleansing the data, along with making it accessible on the centralized database. Each downstream application may then pull the data and perform multiple processing on it. In some instances, these processes include reusing the same data in various forms, going through multiple stages of transformation including, for example, column name changes.

If certain types of failures occur, or perhaps simply if the source of the data would like to be known, significant resources are typically required, as each step may have to be analyzed to determine what changes (or processing, transformations, etc.) have been made to (or performed on) the data and/or the originating source of the data. Although data lineage solutions are useful in such situations, at least to some extent, they are generally only applicable within the same ecosystem. Additionally, in order to identify and trace data changes, the appropriate logic has to be embedded in the application while the application is developed. For applications that have already been created, the code has to be retrofitted to include this functionality (e.g., the application has to be changed or rebuilt). This problem multiples and becomes particularly complicated in platforms that utilize data sources that involve heterogeneous systems, as current data lineage solutions can not address this issue in such instances.

More specifically, lineage of data in multi-staging data processing and repositories is not a trivial task. Systems have to be built specifically to design events, store events, and collect them and construct the lineage graphs. However, existing systems that have been traditionally used for large scale processing does not have a mechanism to interpret the lineage. Converting such systems to provide for capturing the lineage information requires significant resources, in terms of costs, effort, and time. Further, for the new systems, an alternative to explicit event systems is required, and the control of such is ideally included as part of the development systems to enable tracking of the lineage.

Some current systems utilize methods for tracking data lineage from one end of an application to another by using interpreted metadata. In such systems, a selection of a data element for tracing across the application is received. The data element is defined by a hierarchical key stored in a repository. The data element may be traced through multiple applications, platforms, and technologies within an enterprise (or system) to determine how and where the specific data element is utilized. The data element is traced utilizing the hierarchical key that defines it using metadata. In this way, metadata is interpreted and used to trace data lineage from one end of an enterprise to another, and each time the code is changed, an incremental analysis may be conducted to determine what has changed since the previous analysis.

Other systems calculate province and lineage values based on changes in content data and metadata. The lineage values may represent a change in authorship between the changed content data or the content metadata and the original version of the content data or the content metadata. After receiving a change to the content data or the content metadata, a provenance value is calculated based on the change. The provenance value represents a change in content between the changed content data or the content metadata and an original version of the content data or the content metadata. A lineage value is calculated based on the change. The lineage value represents a change in authorship between the changed content data or the content metadata and the original version of the content data or the content metadata.

Some systems provide methods for tracking lineage and provenance of data across multiple tiers and reconstructing data using lineage across tiers from metadata managed in a system hub. Such systems can provide data governance functionality, such as, provenance (i.e., where particular data came from), lineage (i.e., how the data was acquired/processed), security (i.e., who was responsible for the data), classification (i.e., what is the data about), impact (i.e., how impactful is the data to a business), retention (i.e., how long should the data live), and/or validity (i.e., whether the data should be excluded/included for analysis/processing). A graphical user interface may be provided to indicate a lifecycle of data flow based on lineage tracking. The lifecycle may show where the data has been processed and if any errors have occurred during its processing. A timeline view of the data may be provided such that the system may reconstruct data in case of loss using lineage across tiers from metadata managed in the system hub.

Other systems provide for the identifying of data lineage across multiple data sources and assessing the impact of data object changes utilizing artificial intelligence (AI) classification algorithms. Servers capture metadata that defines data objects associated with data sources. The servers generate a data lineage across the data sources for the data objects. The servers extract unstructured text from database incident tickets and match the unstructured text to the metadata. The servers receive a request to change a data object and determine a change impact score for the data object. When the score is below a threshold, the servers execute the change. Distributed server computing devices use the data lineage to identify a mismatch between a data object in a first data source of a relationship and a data object in a second data source of a relationship. The data lineage may be visualized, along with impacts and impact ranks if a change to one or more data objects were to happen based on, for example, the incident or change management tickets as stored in the incident and change management repository.

To address these needs and/or the shortcomings in the prior art, in some embodiments described herein, methods and/or systems are disclosed that provide for the interpretation of data lineage and/or determination of processing/processing steps performed on data. For example, in some embodiments, in a multi-stage data processing system (e.g., a current/conventional multi-stage processing system), one or more file system call is captured and utilized to interpret the actions (or processes) performed on data (e.g., a data element or any suitable file). In some embodiments, similar functionality is implemented utilizing an application programming interface (API) to send and record events. Such may be referred to be below as an "auto lineage API," which may be implemented in the system as a middlebox, as will be appreciated by one skilled in the art.

More specifically, in at least some embodiments described herein, predefined metadata is not utilized to identify a data element. Rather, such is traced by intercepting file system (and/or API) calls and tracing the features/columns/data. Such may be performed utilizing a lineage interpreter that performs file system interpretation, association to application processes, and transformation computations. In some embodiments, a representation of source code is parsed to locate computing instructions, where each of the computing resources used in the computation (or creation) of the selected data element has been utilized. In some embodiments, the methods and systems do not require the parsing of any code to determine changes in data, as the changes are determined based on (or utilizing), for example, file system calls. Additionally, at least some embodiments described herein do not utilize calculations based on a provenance value or impact change score. Rather, as one example, a lineage inducer and lineage interpreter may be utilized to identify and trace lineage (e.g., changes to data elements) by, for example, intercepting file system calls, and store information related to such. In at least some embodiments, the methods (and/or systems) may be integrated into (or utilizing with) existing systems in a non-intrusive (or at least relatively non-intrusive) manner.

That is, in some embodiments, file system calls are interpreted to determine data lineage. More specifically, data sets may be related to specific processes or functions performed to the data utilizing file system calls. Details that may be tracked (or determined, stored, etc.) may include, for example, who owns the data or data set (or any entity related to the data), who has changed the data, what has changed in the data (e.g., which transformation(s) have been applied), etc.

The system may utilize, for example, the following system calls: "open," "creat," "read," "write," "lseek," "close," and "unlink." As will be appreciated by one skilled in the art, the "open" system call may cause the specified file to be opened and the open file identifier to be returned. The "creat" system call may cause the named file to be created as an empty file and the open file identifier to be returned. The "read" system call may cause the count bytes from an open file to be read, and a value associated with the read bytes may be returned. The "write" system call may cause count bytes to be written to an open file, and a value associated with the number of bytes that were actually written may be returned. The "lseek" system call may cause the file location associated with an open file to be changed to a new value, with the new value (or position, location, etc.) being returned. The "close" system call may cause an open filed to be closed, with a value associated with whether or not the named file was closed (e.g., if that the named filed was not previously open). The "unlink" system call may cause the named file to be deleted, with a returned value associated with whether or not the delete was successful. The methods and system described herein may interpret the set of changes in the data caused by such system calls and associate the changes to a specific workflow that has performed the operations (e.g., between two write calls).

As such, the methods and systems described herein allow for the tracking of lineage (and/or provenance, etc.) in data processing systems, regardless of whether or not such functionality is initially implemented or included in the system. The methods and systems described here may be implemented with previously created data processing systems a non-intrusive manner. As alluded to above, in some embodiments, file system calls are utilized to track changes made to data and/or interpret the changes in data after processes, transformations, etc. have been performed to the data. In some embodiments, the functionality described herein may be implemented in (or as) a middlebox (or middleman) between, for example, the application API and the operating system (OS) file system to interpret the data processing (and/or file system) calls and introduce events that capture the changes made to data.

The methods described herein may be implemented in computing environments (or platforms) that include, for example, a data processing system (or module, or subsystem, etc.) that send file system calls to a storage system. In some embodiments, the file system calls may be intercepted by, for example, an API interceptor, and a lineage inducer and/or a lineage interpretation engine (as examples) may determine changes made to the appropriate data (e.g., based on the file system calls).

In some embodiments, APIs (and/or file system calls) that are utilized by the system (e.g., a "big data" system, multi-level data staging system, machine learning system/application, etc.) are loaded (or generated) with additional lineage-capturing information (e.g., information related to changes made to data). In some embodiments, calls (e.g., file system calls) utilized by applications (e.g., ML applications) are intercepted in the operating system (OS), and lineage is determined based on the calls, which are then sent (or provided) to the file system controller. In some embodiments, the calls utilized are intercepted between the file system controller and a storage (system) controller, and lineage is determined based on the calls.

It should be understood that at least some of the aspects of functionality described herein may be performed utilizing and/or as a part of a cognitive analysis (and/or machine learning technique). The cognitive analysis may include natural language processing (NLP) or a NLP technique, such classifying natural language, analyzing tone, and analyzing sentiment (e.g., scanning for keywords, key phrases, etc.) with respect to, for example, content and communications sent to and/or received by users or entities and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for object detection/classification in images/videos), as are commonly understood, are used.

The processes described herein may utilize various information or data sources associated with users and/or entities and/or various type of content. The data sources may include any available information (or data) sources associated with the user and/or entities. For example, in some embodiments, a profile (e.g., a cognitive profile) for the user(s) (and/or entities) may be generated. Data sources that may be use used to generate cognitive profiles may include any appropriate data sources associated with the user/entity that are accessible by the system (perhaps with the permission or authorization of the user/entity). Examples of such data sources include, but are not limited to, communication sessions and/or the content (or communications) thereof (e.g., phone calls, video calls, text messaging, emails, in person/face-to-face conversations, etc.), a profile of (or basic information about) the user/entity (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize and/or be performed part of a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, data traceability and provenance as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for determining processing performed on a data element, by a processor, are provided. A file system call associated with a data element stored in a storage system is detected. The file system call is analyzed. Data lineage for the data element is determined based on the analyzing of the file system call.

A representation of the data lineage for the data element may be generated. The representation of the data lineage for the data element may be caused to be rendered.

At least one of the analyzing of the file system call and the determining of the data lineage for the data element may include determining a difference in the data element associated with the file system call. The data lineage for the data element may be caused to be stored.

At least one of the detecting of the file system call and the analyzing of the file system call may be performed by a middlebox. The middlebox may intercept the file system call between an application programming interface (API) and an operating system (OS) file system. The file system call may be associated with at least one of reading a file, writing a file, and opening a file.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
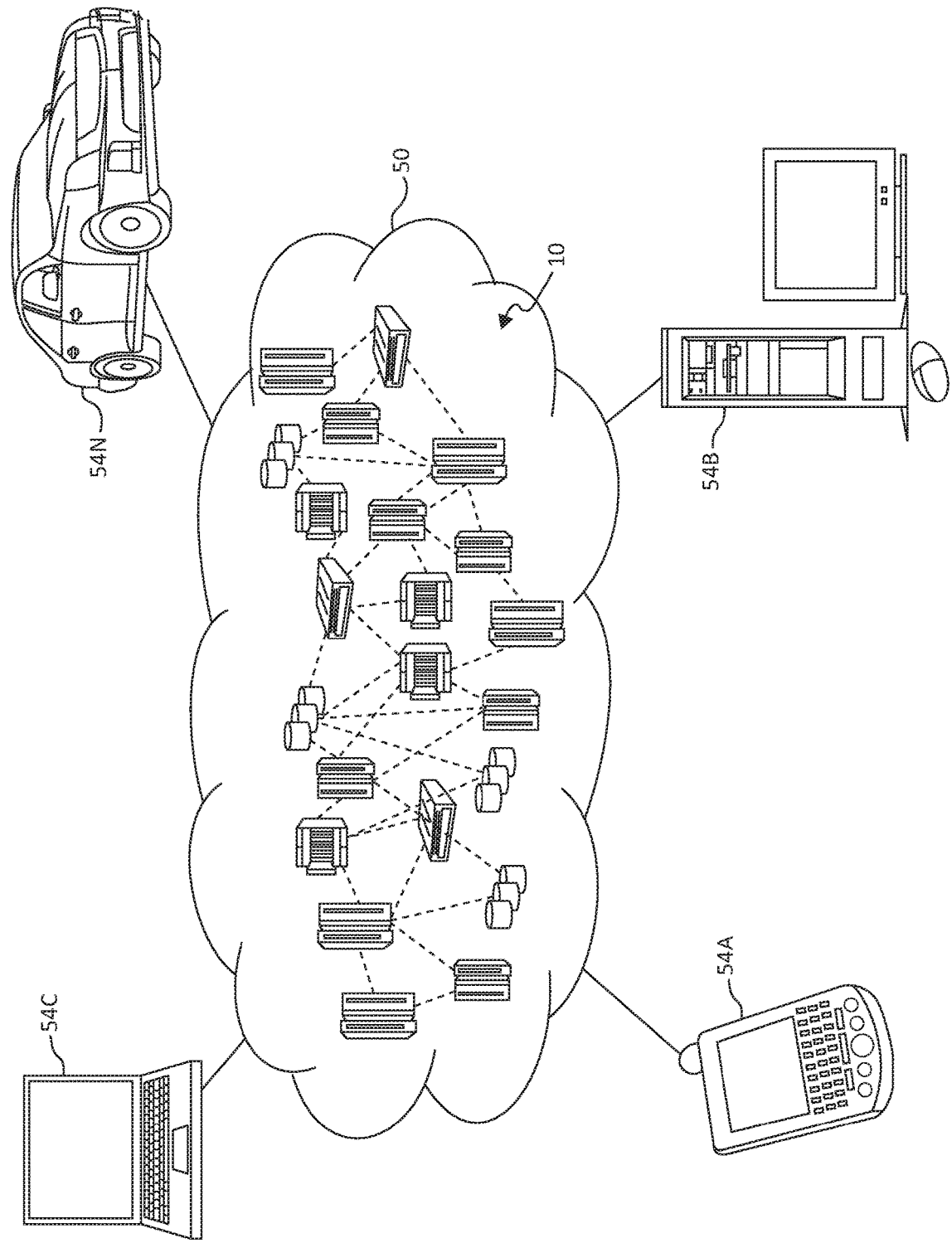
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
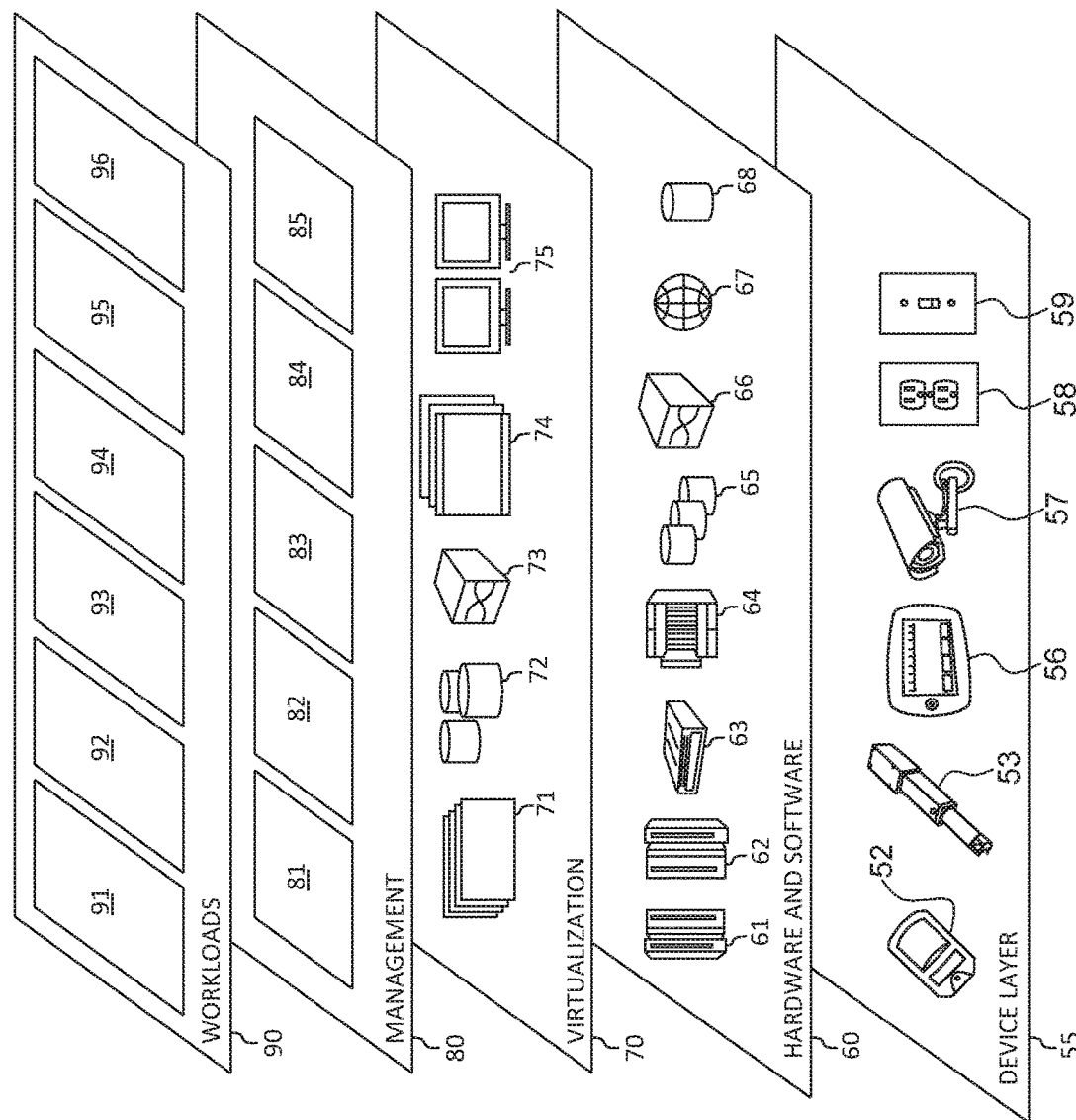
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for data traceability and provenance, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are disclosed that provide for the interpretation of data lineage. For example, in some embodiments, in a multi-stage data processing system (e.g., a current/conventional multi-stage processing system), file system calls are captured and utilized to interpret the actions (or processes) performed on data. In some embodiments, similar functionality is implemented utilizing an application programming interface (API) to send and record events. Such may be referred to be below as an "auto lineage API," which may be implemented in the system as a middlebox, as will be appreciated by one skilled in the art.

In some embodiments, file system calls are interpreted to determine data lineage. More specifically, data sets may be related to specific processes or functions performed to the data utilizing file system calls. Details that may be tracked (or determined, stored, etc.) may include, for example, who owns the data or data set (or any entity related to the data), who has changed the data, what has changed in the data (e.g., which transformation(s) have been applied), etc. The methods and system described herein may interpret the set of changes in the data caused by such system calls and associate the changes to a specific workflow that has performed the operations (e.g., between two write calls).

As such, the methods and systems described herein allow for the tracking of lineage in data processing systems, regardless of whether or not such functionality is initially implemented or included in the system. The methods and systems described here may be implemented with previously created data processing systems a non-intrusive manner. As alluded to above, in some embodiments, file system calls are utilized to track changes made to data and/or interpret the changes in data after processes, transformations, etc. have been performed to the data. In some embodiments, the functionality described herein may be implemented in (or as) a middlebox (or middleman) between, for example, the application API and the operating system (OS) file system to interpret the data processing (and/or file system) calls and introduce events that capture the changes made to data.

In some embodiments, APIs (and/or file system calls) that are utilized by the system (e.g., a "big data" system, multi-level data staging system, machine learning system/application, etc.) are loaded (or generated) with additional lineage-capturing information (e.g., information related to changes made to data). In some embodiments, calls (e.g., file system calls) utilized by applications (e.g., ML applications) are intercepted in the operating system (OS), and lineage is determined based on the calls, which are then sent (or provided) to the file system controller. In some embodiments, the calls utilized are intercepted between the file system controller and a storage (system) controller, and lineage is determined based on the calls.

Figure 4:
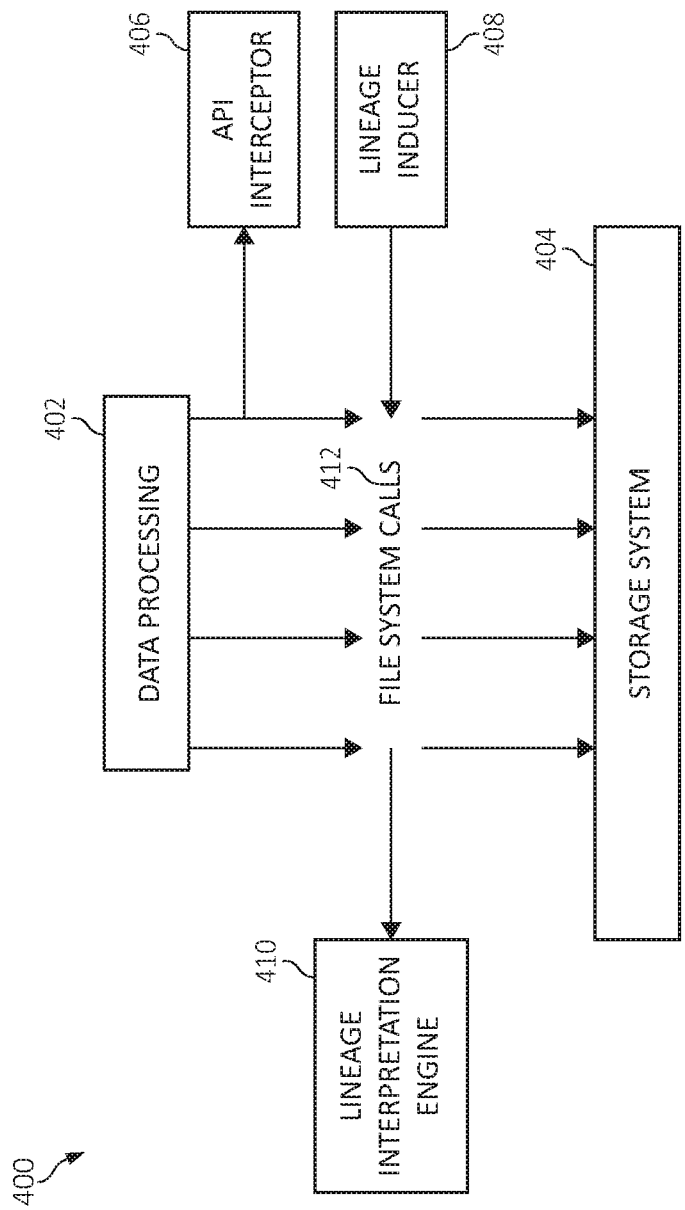
FIG. 4 is a simplified block diagram of a computing environment according to an embodiment of the present invention.

FIG. 4 illustrates a simplified computing environment 400 in which the methods and systems described herein (e.g., for determining processing performed on a data element, determining data lineage for a data element, etc.) may be utilized. The environment 400 includes a data processing system (or module) 402, a storage system 404, an API interceptor 406, a lineage inducer 408, and a lineage interpretation engine 410. Each of the components shown in FIG. 4 (and/or any other components shown in other figures) may be implemented utilizing any suitable computing node (e.g., a computing device and/or application), and in some embodiments, the components may be integrated into common computing nodes. In embodiments utilizing multiple computing nodes, the nodes may be located locally or remotely (i.e., in operable communication via any suitable communications network).

Still referring to FIG. 4, generally, the data processing system 402 (as at least a portion of its operation) generates file system calls 412 that are provided (or sent to) the storage system 404, which are associated with data (e.g., data files, such as spreadsheets, data tables/columns, or any other suitable data files) stored thereon. As described above, examples of file system calls may include, for example, calls to read, write, or any other suitable operation. In the example shown, the API interceptor 406 detects (or "intercepts," receives, etc.) the file system calls and may provide them to the lineage inducer 408. The lineage inducer 408, perhaps along with the lineage interpretation engine 410, may determine the changes made to the relevant data (e.g., determine the "delta" between the first/original version of the data and the second/altered version of the data based on the file system calls and/or extra data introduced to capture the difference).

Figure 5:
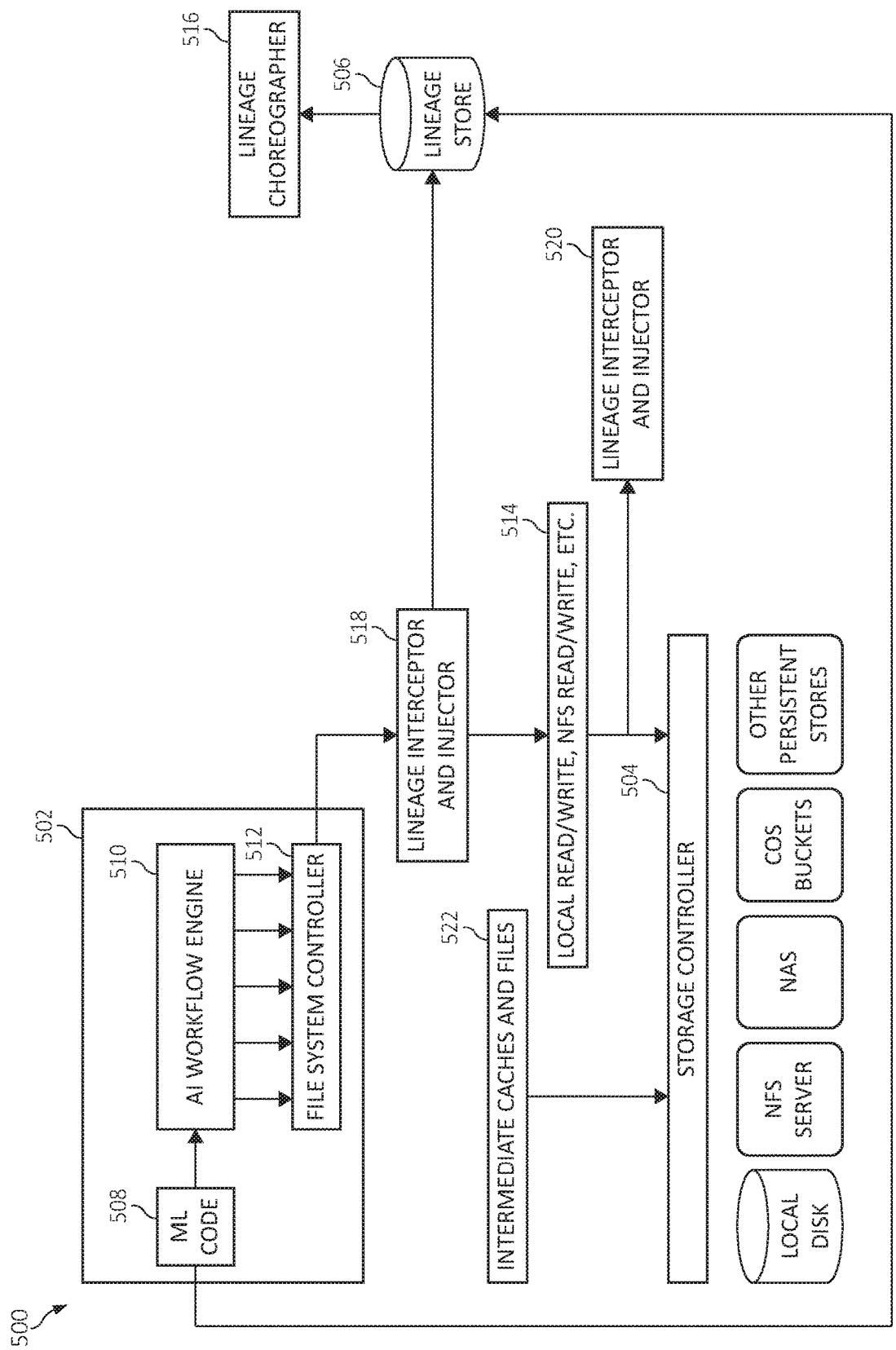
FIG. 5 is a block diagram of a computing environment according to an embodiment of the present invention.

FIG. 5 illustrates a more detail computing environment 500 in which the methods and systems described herein (e.g., for determining processing performed on a data element, etc.) may be utilized. The environment 500 includes, among other components, a data processing system 502, a storage controller 504, and a lineage store (or database) 506. In the example shown, the data processing system 502 includes a machine learning (ML) code depository 508, an artificial intelligence (AI) workflow engine 510, and a file system controller 512. The ML code depository 508 may include various code, applications, models, etc. configured to perform various machine learning techniques, cognitive analysis, etc. The AI workflow engine 510 may be suitably configured to perform various types of data processing utilizing the ML code along with any selected data. For example, the AI workflow engine 510 may be configured to perform various steps/functionality of an AI workflow to data, such as ingesting (data), preparing, preprocessing, discovering, developing, training, testing/analyzing, and deploying, as will be appreciated by one skilled in the art. The file system controller 512 may control how data is stored and retrieved, as is commonly understood. The file system controller 512 may generate and/or utilize various file system calls and/or APIs, as described above, which may be included in the ML code depository 508. As one example, the data processing system 502 may be considered to be a "big data" processing system.

The storage controller 504 may be in operable communications and/or control various types of memory devices. Example include, but are not limited to, those shown in FIG. 5 (e.g., local disk(s), network file system (NFS) server(s), network attached storage (NAS), cloud object storage (COS) bucket(s), and other persistent stores).

In some embodiments, the file system calls (and/or APIs) used in the ML code are overloaded with lineage capturing information (or lineage capturing information is added to the file system calls). In such embodiments, the file system calls may be provided to and/or stored in the lineage store 506, and then utilized by a lineage choreographer 516, which may generate (e.g., upon request) information related to the lineage of any altered data. For example, the lineage choreographer 516 may generate a representation of any request data lineage and cause an indication thereof to be provided to a user (e.g., on a display screen of a computing device, via electronic communication, aural indications, etc.).

In some embodiments, file system calls 514 are intercepted and/or injected by a lineage interceptor and injector 518 in the operating system (OS), and lineage is determined based on the calls and stored in the lineage store 506. The calls are then sent (or provided) to the storage controller 504. In some embodiments, the calls utilized are intercepted between the file system controller 512 and the storage controller 520 by a lineage interceptor and injector 520. It should be understood that in some embodiments, only one of the lineage interceptor and injectors 518 and 520 are included, and in some embodiments, neither of them is utilized. The calls may be provided to the storage controller 504, which may utilize the calls, perhaps along with intermediate caches and files 522.

Figure 6:
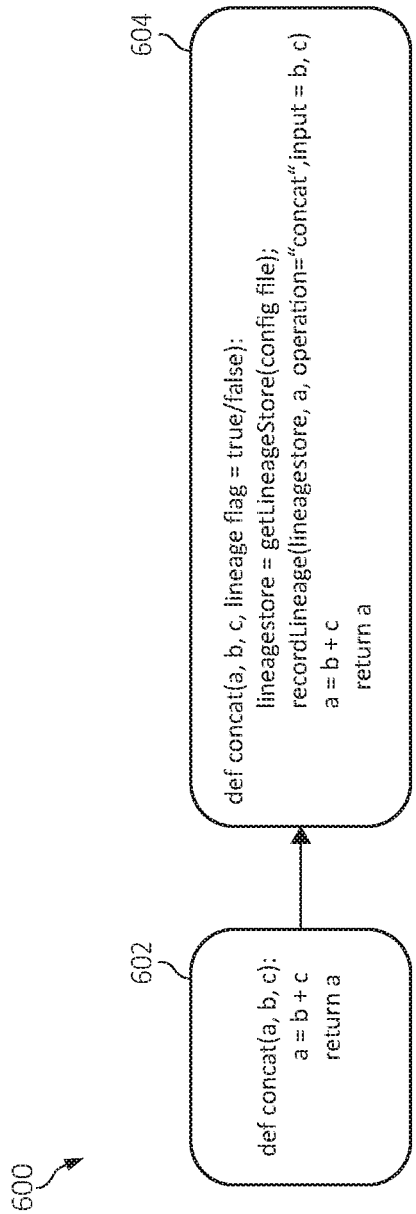
FIG. 6 is a block diagram showing details of a file system call before and after being amended with lineage capturing information according to an embodiment of the present invention.

FIG. 6 illustrates an exemplary file system call (or API) 600 that has been amended with lineage capturing information (e.g., a "lineage API") and/or (at least a portion of) a method for determining data lineage according to some embodiments described herein. In particular, FIG. 6 includes a standard or non-amended file system call 602 and an amended file system call 604 (with appropriate pseudocode listed therein). That is, FIG. 6 may be understood to show a "before and after" representation of an exemplary file system call after being amended with lineage capturing information. More specifically, call 602 includes pseudocode associated with a concatenation function, as is commonly understood, while call 604 includes the same pseudocode but in an amended form to include additional lineage capturing information, as will be appreciated by one skilled in the art. It should be understood that the file system call and/or associated transformation shown in FIG. 6 is merely intended as an example, as other calls and/or transformations may be utilized (e.g., append, reshape, or any other call such as those described above).

Figure 7:
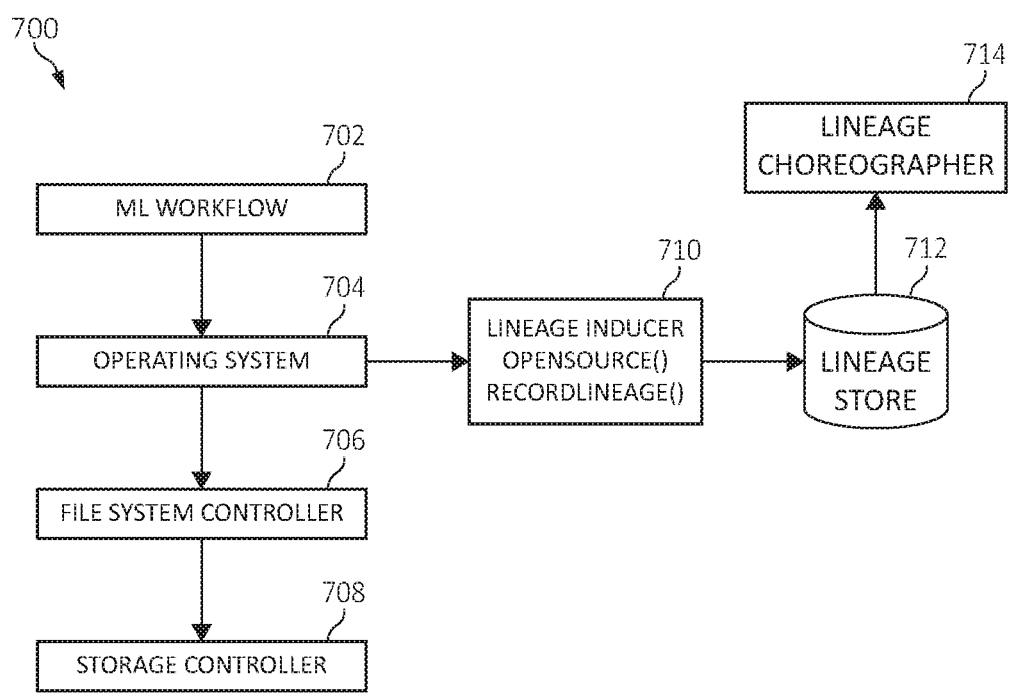
FIG. 7 is a block diagram of a method for determining data lineage according to an embodiment of the present invention.

FIG. 7 illustrates a method (and/or system) 700 for determining data lineage (or for determining processing/processing steps performed on data element) according to some embodiments described herein. The method 700 may be implemented utilizing a system such as that shown in FIG. 5. In FIG. 7, a file system call (or one or more calls) is passed through, for example, a ML (or AI) workflow engine 702 to an operating system 704. From the operating system 704, the call is that passed to a file system controller 706, and then to a storage controller 708, as described above. As shown, a linear inducer 710 may intercept the call in the operating system 704 and may determine any changes made to the appropriate data due to the call. This information may be provided to a lineage store 712 and made available to a lineage choreographer 714, as described above. It should be noted that in the embodiment shown in FIG. 7 (i.e., at the application level), a relatively wide range of transformations (and/or associated calls/APIs) may be available (e.g., concatenate, append, reshape, etc.).

Figure 8:
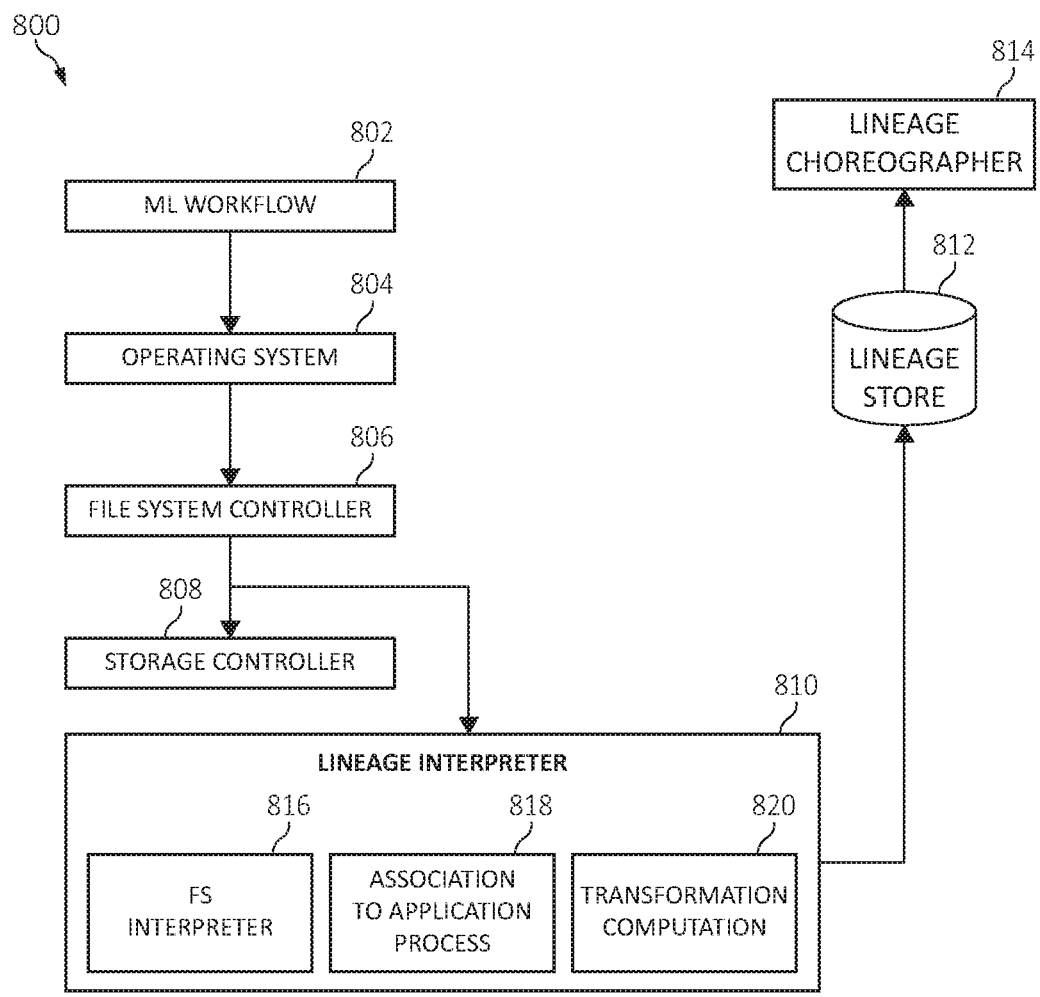
FIG. 8 is a block diagram of a method for determining data lineage according to an embodiment of the present invention.

FIG. 8 illustrates a method (and/or system) 800 for determining data lineage (or for determining processing performed on a data element) according to some embodiments described herein. The method 800 may be implemented utilizing a system such as that shown in FIG. 5. In FIG. 8, a file system call (or one or more calls) is passed through, for example, a ML (or AI) workflow engine 802 to an operating system 804. From the operating system 804, the call is that passed to a file system controller 806, and then to a storage controller 808, as described above. As shown, a lineage interpreter 810 may intercept the call between the file system controller 806 and the storage controller 808. The lineage interpreter 810 may generally determine the lineage, which may include determining the operation or transformation being performed on the data and determining the change(s) that is being made to the data, which may be stored in a lineage store 812 and made available to a lineage choreographer 814, as described above. In the example shown, the lineage interpreter 810 includes a file system (FS) interpreter, an association to application process module 818, and a transformation computation module 820. It should be noted that in the embodiment shown in FIG. 8 (i.e., at the file system/storage controller lever), a relatively limited set of functions (and/or associated calls/APIs) compared to the application level may be available (e.g., read, write, open, delete, etc.).

With respect to the method shown in FIG. 8 (and/or any other methods and systems described herein), interpreting transformations may be performed in a "top down" or "bottom up" manner. That is, the lineage may be determined by starting at a subsequent/later version of the data and tracing back to an earlier version of the data or by starting at the earlier version of the data and tracing forward to a later version of the data.

Figure 9:
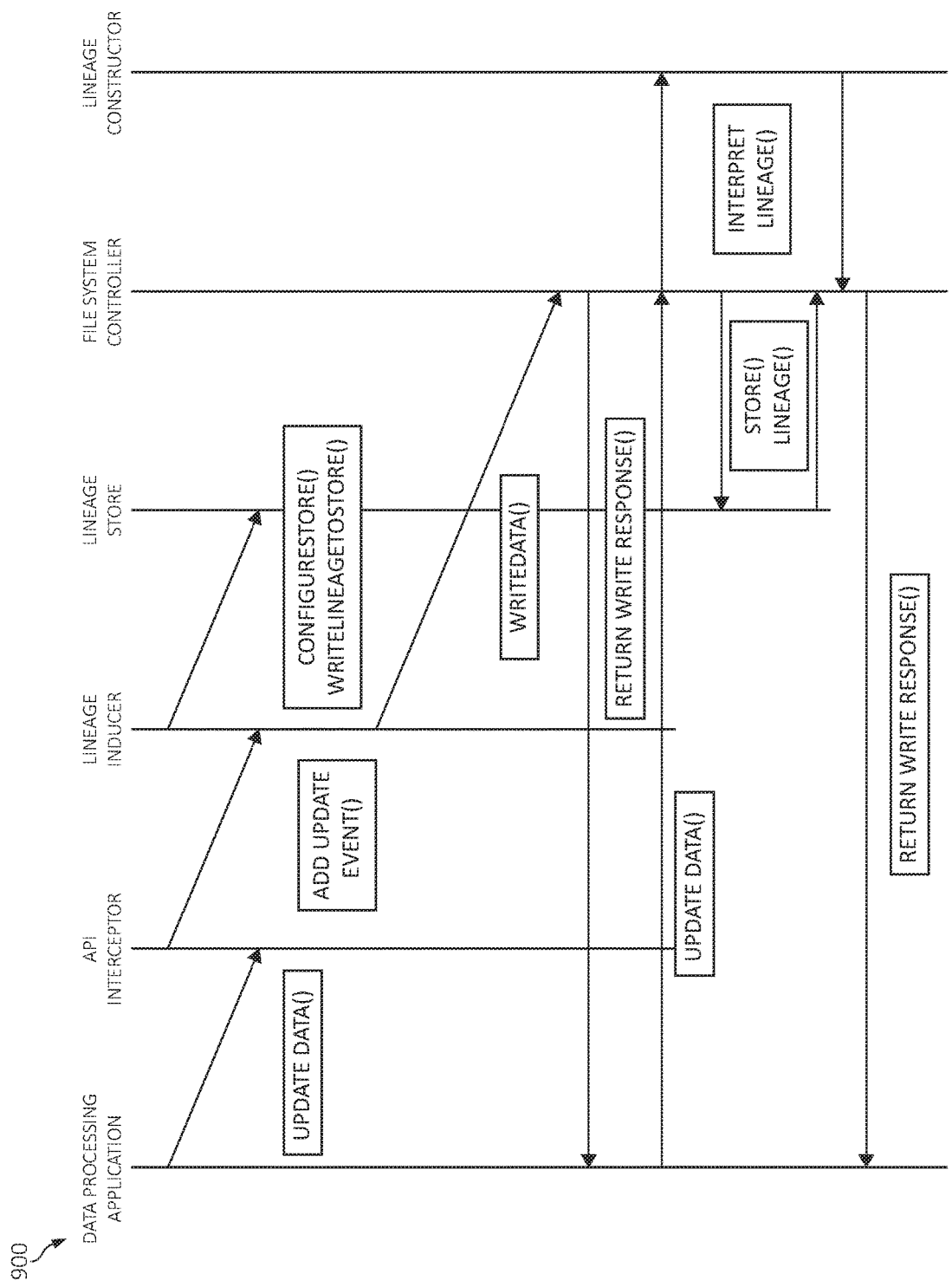
FIG. 9 is a representation of an exemplary flow of functions between various components of a system according to an embodiment of the present invention.

FIG. 9 illustrates an exemplary flow of functions/transformations and/or calls/APIs between various components of a system according to an embodiment of the present invention. As shown, the system includes a data processing application, an API interceptor, a lineage inducer, a lineage store, a file system controller, and a lineage constructor. As shown, as one example, the data processing application may generate an "update data" functionality that is sent to the file system controller. However, such a function is also detected by the API interceptor, which initiates the lineage of the data to be determined and stored as shown and described above.

Figure 10:
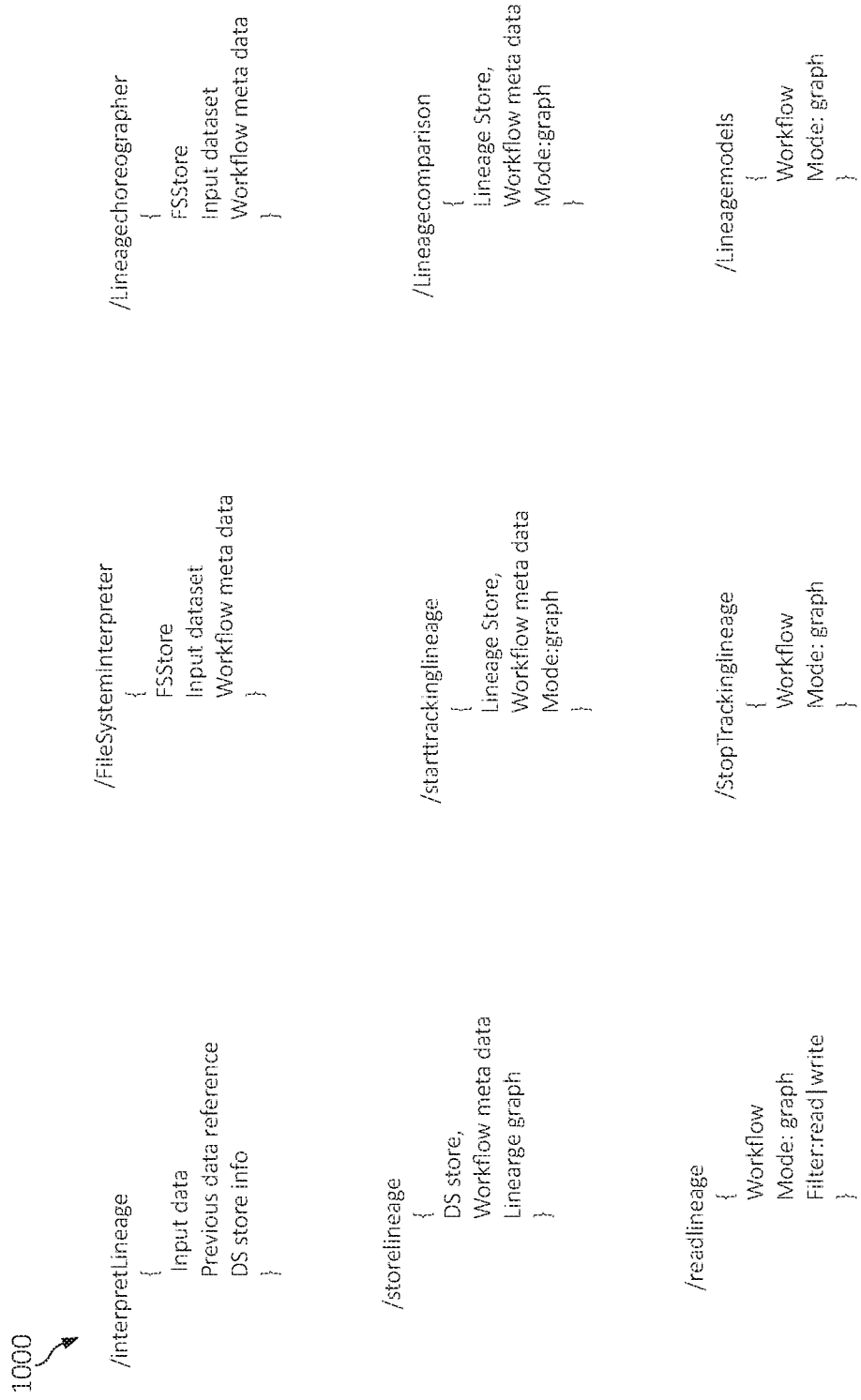
FIG. 10 illustrates an array of various exemplary APIs written in pseudocode according to an embodiment of the present invention.

FIG. 10 illustrates various exemplary APIs (and/or system calls), written in pseudocode and arranged in an array 1000, that may be utilized by the methods and systems described herein. As shown and will be appreciated by one skilled in the art, the APIs are associated with functionalities such as interpreting lineage, storing lineage, comparing lineage, generating lineage models, etc.

Figure 11:
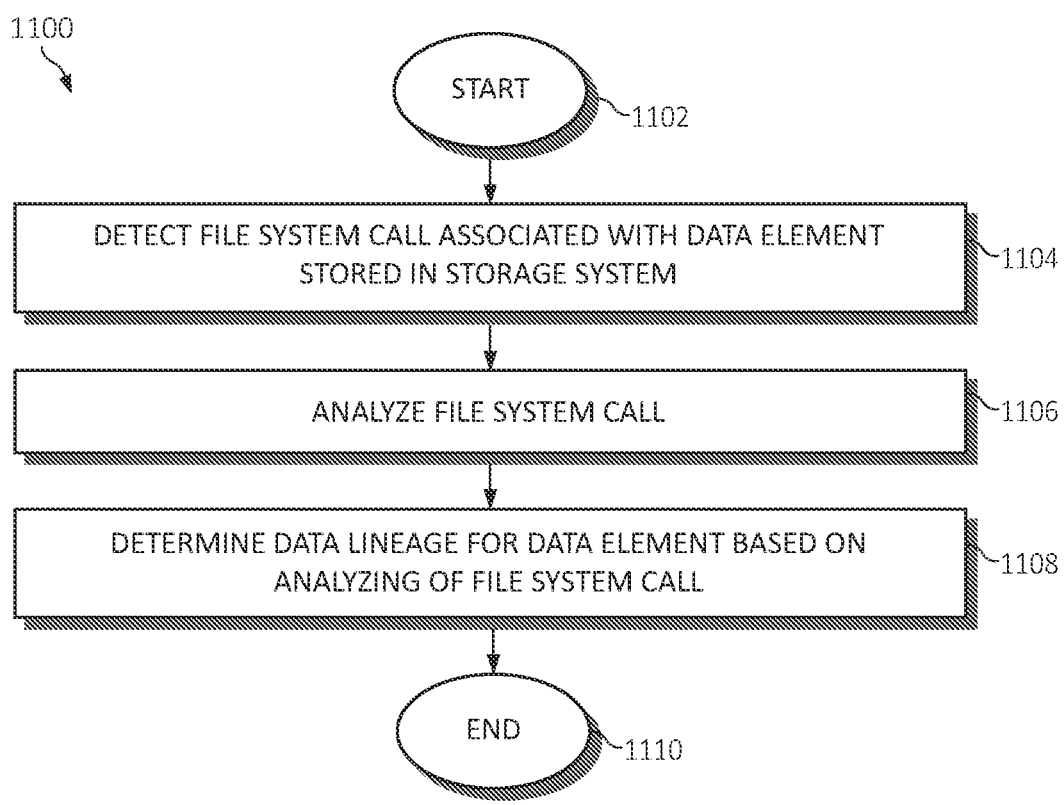
FIG. 11 is a flowchart diagram of an exemplary method for determining processing performed on a data element according to an embodiment of the present invention.

Turning to FIG. 11, a flowchart diagram of an exemplary method 1100 for determining processing/processing steps performed on data (or a data lineage of a data element) is provided. Method 1100 begins (step 1102) with, for example, a data processing system beginning a workflow, such as one that involves or utilizes AI, ML, a cognitive analysis, etc.

A file system call associated with a data element stored in a storage system is detected (step 1104). The file system call may be associated with at least one of, for example, reading a file, writing a file, and opening a file.

The file system call is analyzed (step 1106). At least one of the detecting of the file system call and the analyzing of the file system call may be performed by a middlebox. The middlebox may intercept the file system call between an application programming interface (API) and an operating system (OS) file system.

Data lineage for the data element is determined based on the analyzing of the file system call (step 1108). At least one of the analyzing of the file system call and the determining of the data lineage for the data element may include determining a difference in the data element associated with the file system call.

Method 1100 ends (step 1110) with, for example, the data lineage for the data element being stored and a representation thereof being generated and rendered (e.g., to a user, at the request of the user). In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for determining processing performed on a data element, by a processor, comprising:
   detecting a file system call associated with a data element stored in a storage system by intercepting the file system call between a source and a destination of the file system call by a middlebox;
   analyzing the file system call including interpreting a workflow of operations performed on the data according to changes in the data element from a previous file system call to the file system call, wherein, subsequent to analyzing the file system call, the middlebox forwards the file system call to the destination; and
   determining data lineage for the data element based on the analyzing of the file system call in lieu of tracing the data lineage through predefined metadata associated with the data element.

2. The method of claim 1, further comprising:
   generating a representation of the data lineage for the data element; and
   causing the representation of the data lineage for the data element to be rendered.

3. The method of claim 1, wherein at least one of the analyzing of the file system call and the determining of the data lineage for the data element includes determining a difference in the data element associated with the file system call.

4. The method of claim 1, further comprising causing the data lineage for the data element to be stored.

5. The method of claim 1, wherein the middlebox intercepts the file system call between an application programming interface (API) and an operating system (OS) file system.

6. The method of claim 1, wherein the file system call is associated with at least one of reading a file, writing a file, and opening a file.

7. A system for determining processing performed on a data element comprising:
   a processor executing instructions stored in a memory device, wherein the processor:
      detecting a file system call associated with a data element stored in a storage system by intercepting the file system call between a source and a destination of the file system call by a middlebox;

analyzing the file system call including interpreting a workflow of operations performed on the data according to changes in the data element from a previous file system call to the file system call, wherein, subsequent to analyzing the file system call, the middlebox forwards the file system call to the destination; and determining data lineage for the data element based on the analyzing of the file system call in lieu of tracing the data lineage through predefined metadata associated with the data element.

8. The system of claim 7, wherein the processor further:
generates a representation of the data lineage for the data element; and
causes the representation of the data lineage for the data element to be rendered.

9. The system of claim 7, wherein at least one of the analyzing of the file system call and the determining of the data lineage for the data element includes determining a difference in the data element associated with the file system call.

10. The system of claim 7, wherein the processor further causes the data lineage for the data element to be stored.

11. The system of claim 7, wherein the middlebox intercepts the file system call between an application programming interface (API) and an operating system (OS) file system.

12. The system of claim 7, wherein the file system call is associated with at least one of reading a file, writing a file, and opening a file.

13. A computer program product for determining processing performed on a data element, by a processor, the computer program product embodied on a non-transitory computer-readable storage medium having computer-readable program code portions stored therein, the computer-readable program code portions comprising:

an executable portion that detects a file system call associated with a data element stored in a storage system by intercepting the file system call between a source and a destination of the file system call by a middlebox;

an executable portion that analyzes the file system call including interpreting a workflow of operations performed on the data according to changes in the data element from a previous file system call to the file system call, wherein, subsequent to analyzing the file system call, the middlebox forwards the file system call to the destination; and an executable portion that determines data lineage for the data element based on the analyzing of the file system call in lieu of tracing the data lineage through predefined metadata associated with the data element.

14. The computer program product of claim 13, wherein the computer-readable program code portions further include:

an executable portion that generates a representation of the data lineage for the data element; and
an executable portion that causes the representation of the data lineage for the data element to be rendered.

15. The computer program product of claim 13, wherein at least one of the analyzing of the file system call and the determining of the data lineage for the data element includes determining a difference in the data element associated with the file system call.

16. The computer program product of claim 13, wherein the computer-readable program code portions further include an executable portion that causes the data lineage for the data element to be stored.

17. The computer program product of claim 13, wherein the middlebox intercepts the file system call between an application programming interface (API) and an operating system (OS) file system.

18. The computer program product of claim 13, wherein the file system call is associated with at least one of reading a file, writing a file, and opening a file.

* * * * *